United States Patent
Rose et al.

(10) Patent No.: US 9,674,705 B2
(45) Date of Patent: Jun. 6, 2017

(54) METHOD AND SYSTEM FOR SECURE PEER-TO-PEER MOBILE COMMUNICATIONS

(71) Applicants: Kenneth Hugh Rose, Annapolis, MD (US); Mark Stanley Krawczewicz, Annapolis, MD (US)

(72) Inventors: Kenneth Hugh Rose, Annapolis, MD (US); Mark Stanley Krawczewicz, Annapolis, MD (US)

(*) Notice: Subject to any disclaimer, the term of this patent is extended or adjusted under 35 U.S.C. 154(b) by 0 days.

(21) Appl. No.: 15/136,733

(22) Filed: Apr. 22, 2016

(65) Prior Publication Data

US 2016/0316367 A1 Oct. 27, 2016

Related U.S. Application Data

(60) Provisional application No. 62/151,054, filed on Apr. 22, 2015.

(51) Int. Cl.
| | |
|---|---|
| *H04L 9/32* | (2006.01) |
| *H04L 29/06* | (2006.01) |
| *H04L 29/08* | (2006.01) |
| *H04W 12/02* | (2009.01) |
| *H04W 12/04* | (2009.01) |

(Continued)

(52) U.S. Cl.
CPC .......... *H04W 12/06* (2013.01); *H04B 5/0037* (2013.01); *H04L 9/3231* (2013.01); *H04L 9/3234* (2013.01); *H04L 9/3273* (2013.01); *H04L 63/0861* (2013.01); *H04L 67/104* (2013.01); *H04W 4/008* (2013.01); *H04W 12/02* (2013.01); *H04W 12/04* (2013.01)

(58) Field of Classification Search
CPC ..... H04W 12/06; H04W 12/04; H04W 12/02; H04W 4/008; H04L 9/3273; H04L 9/3234; H04L 9/3231; H04L 67/104; H04L 63/0861; H04B 5/0037
See application file for complete search history.

(56) References Cited

U.S. PATENT DOCUMENTS

| | | | | |
|---|---|---|---|---|
| 8,880,027 | B1* | 11/2014 | Darringer | G06F 21/35 |
| | | | | 455/41.1 |
| 2010/0088188 | A1* | 4/2010 | Kumar | G06Q 20/10 |
| | | | | 705/17 |

(Continued)

OTHER PUBLICATIONS

Ngu, Matthew et al., "How Secure are Contactless Payment Systems?", RSAConference2015 Apr. 20-24, 2015, pp. 1-44.*

*Primary Examiner* — Michael Pyzocha
(74) *Attorney, Agent, or Firm* — 24IP Law Group; Timothy R DeWitt

(57) ABSTRACT

A system and method for secure peer-to-peer mobile communications using cryptographic mobile unlock tokens ("CK tokens") in conjunction with mobile devices. Each CK token integrates an entire cryptosystem. Executing these cryptographic based functions entirely in the token have significant operational advantages over the typically memory-only tokens. A more secure, scalable, and lower overall system cost are just a few advantages of the CK token over executing these functions within the smartphone. Of the many uses discussed for the CK token, mobile phone enabling, stored value and medical applications, most have centered on the use of the card in conjunction with a smartphone as the touch point in the transaction.

7 Claims, 14 Drawing Sheets

(51) Int. Cl.
*H04W 12/06* (2009.01)
*H04W 4/00* (2009.01)
*H04B 5/00* (2006.01)

(56) References Cited

U.S. PATENT DOCUMENTS

| | | | |
|---|---|---|---|
| 2011/0185183 A1* | 7/2011 | Yamamoto | G06F 21/33 713/182 |
| 2012/0159148 A1* | 6/2012 | Behren | G06Q 20/3552 713/150 |
| 2012/0321084 A1* | 12/2012 | Le Saint | H04L 9/3234 380/277 |
| 2012/0323717 A1* | 12/2012 | Kirsch | G06Q 20/0855 705/26.1 |
| 2013/0152185 A1* | 6/2013 | Singh | G06F 21/35 726/9 |
| 2013/0191232 A1* | 7/2013 | Calman | G07F 19/201 705/18 |
| 2013/0200146 A1* | 8/2013 | Moghadam | G06Q 40/04 235/379 |
| 2013/0232082 A1* | 9/2013 | Krawczewicz | G06F 19/323 705/55 |
| 2014/0149746 A1* | 5/2014 | Yau | G06F 21/35 713/185 |
| 2014/0207680 A1* | 7/2014 | Rephlo | H04B 5/0031 705/44 |
| 2015/0012437 A1* | 1/2015 | Park | G06Q 20/4014 705/44 |
| 2016/0125180 A1* | 5/2016 | Smith | G06F 21/34 726/7 |
| 2016/0335619 A1* | 11/2016 | Ce | G06Q 20/02 |

* cited by examiner

METHOD AND SYSTEM FOR SECURE PEER-TO-PEER MOBILE COMMUNICATIONS

CROSS-REFERENCE TO RELATED APPLICATIONS

The present application claims the benefit of the filing date of U.S. Provisional Patent Application Ser. No. 62/151,054 filed by the present inventors on Apr. 22, 2015.

The aforementioned provisional patent application is hereby incorporated by reference in its entirety.

STATEMENT REGARDING FEDERALLY SPONSORED RESEARCH OR DEVELOPMENT

None.

BACKGROUND OF THE INVENTION

Field of the Invention

The present invention relates to tokens for unlocking secure systems or data. More specifically, the present invention relates to a method and system for secure peer-to-peer mobile communications.

Brief Description of the Related Art

A variety of systems and methods for secure authentication using a token have been used in the past. Such smart tokens may be in the form of smartcards, USB tokens or other forms. Conventional smartcards typically are credit-card sized and made out of flexible plastic such as polyvinyl chloride. Smartcards have been used in a wide variety of applications, such as identification badges, membership cards, credit cards, etc. Conventional USB token are typically small and portable and may be of any shape. They are embedded with a micromodule containing a silicon integrated circuit with a memory and a microprocessor.

Traditional plastic card ID credentials rely on printed inks and tamper evident materials like holograms, printed static 2D barcodes, and passwords for security and to protect user data from modifications. To verify these traditional cards, readers employ multimodal optical and wavelength sensors in an attempt to verify a user's identity printed on the card.

Smartcards can be either "contact" or "contactless." Contact cards typically have a visible set of gold contact pads for insertion into a card reader. Contactless cards use radio frequency signals to operate. Other smart tokens connect to other devices through a USB or other communications port.

Smart cards typically may have information or artwork printed on one or both sides of the card. Since smart cards are typically credit card sized, the amount of information that may be displayed on a smartcard is typically limited. A number of efforts have been made to increase the amount of data that may be displayed on a smartcard. For example, U.S. Pat. No. 7,270,276 discloses a multi-application smartcard having a dynamic display portion made, for example, of electronic ink. The display on that card changes from a first display to a second display in response to an application use of the smartcard. Another example is U.S. Patent Publication Serial No. US2005/0258229, which disclosed a multi-function smartcard (also known as an "integrated circuit card" or "IC card") with the ability to display images on the obverse side of the card.

A display of images on a flexible display within a card typically implements an active pixel matrix display type display which has the ability to show 8 or more degrees of gray scale on each pixel. The two dimensional array of these gray scale pixels generate an image of a cardholder face. A segmented type flexible display has only two states (black or white). A group of seven segments will comprise any single digit number whereas a group of 14 segments will denote any alphabetic or numeric letter or digit. The display and control circuitry is much more simplistic for segmented displays than for active matrix displays. The present application addresses only segmented flexible bi-state displays for secure ID credentials.

Access control stations typically located on the boundary of the security area or building use some method to verify or authenticate the uses who are allowed access. The general methods to authenticate include one or more of the following defined as 1, 2, or 3 factor authentication:
1. What you have—a card or ID machine or visually checked by a guard
2. What you know—a password typed into a keypad
3. What you are—a physical biometric attribute comparing a pre-stored "template"

to a live scan using some hardware at the access control station

There are many shortfalls and added system complexities for implementing these access control methods like; user data must be stored on a database or within the card securely, cards can be duplicated or lost, passwords can be hacked, biometrics are difficult and costly to store and scale to larger access control networks.

More recently, biometric thumb drive tokens and smartcards have proven ineffective and non-secure. These shortcomings vary but complexity, scalability, and interoperability are common causes. It was found that biometrics are challenging to enroll and deploy when the user's information is stored and retrieved on a central database.

Other shortfalls with 3-factor authentication using cards and access control portals are portability, scalability, and verification the machine-based authentication actually happened. This part of the transaction is usually completely transparent to the user and/or verifying official until the end of the process.

Recently, efforts have been made to incorporate displays into RFID cards and tags. For example, in U.S. Patent App. Pub. No. 2010/0052908 entitled "Transient State Information Display in an RFID Tag," a display is incorporated into an RFID card to show a transient state such as an age of a product. In the preferred embodiment disclosed in that patent, a card or tag reader provides a current date while the card provides the expiration date of the product. Based on a comparison of those two, an LED is illuminated to reflect the status of the product. The disclosure indicates that a variety of other types of displays may be used and also that the card may be active or passive. In another example, U.S. Patent App. Pub. No. 2010/0079416 entitled "Radio Frequency Identification (RFID), Display Pixel, and Display Panel and Display Apparatus Using RFID Display Pixel" discloses an RFID tag connected to an "RFID pixel" or plurality of "RFID pixels." Another example is described in U.S. Patent App. Pub. No. 2009/0309736 entitled "Multifunction Contactless Electronic Tag for Goods."

Additional examples in those disclosed in U.S. Patent Application Publication No. 2012/0181333 entitled "ID Credential with Bi-State Display for Unlocking Devices and U.S. Patent Application Publication No. 2011/0279242 entitled "Batteryless Stored Value Card with Display.

SUMMARY OF THE INVENTION

In a preferred embodiment, the present invention is a system and method for secure peer-to-peer mobile communications using cryptographic mobile unlock tokens in conjunction with mobile devices. The cryptographic mobile unlock tokens of the present invention (the "CK token") are a new class of token with unique capabilities to perform secure functions for peer-to-peer mobile applications. Each card integrates an entire cryptosystem that would normally be put place, for example, in a mobile phone. Executing these cryptographic based functions entirely in the token have significant operational advantages over the typically memory-only tokens. A more secure, scalable, and lower overall system cost are just a few advantages of the CK token over executing these functions within the smartphone. Of the many uses discussed for the CK token, mobile phone enabling, stored value and medical applications, most have centered on the use of the card in conjunction with a smartphone as the touch point in the transaction.

In a preferred embodiment, the CK tokens are used not only for local transactions but also connected remotely to a similar combination of card and smartphone for an extended variety of uses. This allows the same functions to be performed remotely but with a significant array of added features. Note that the details of the public key transactions (primarily signatures used for authentication) involved in each of these use cases have, for the most part, been omitted for simplicity sake and are described elsewhere. Also note that the key management and initialization processes needed for support are not detailed here but each could take one of several known forms, as noted below.

In a preferred embodiment, the present invention is a method for secure mobile communications between a first user having a first mobile communications device and a first secure token and a second user having a second mobile communications device and a second secure token. The first and second mobile devices each has a near-field communications reader, a user interface and a display. The first secure token has a first secure processor, a first secure non-volatile memory having decryption key information stored therein, a first display, a first power near-field communications antenna and a first data near-field communications antenna. The second secure token similarly has a second secure processor, a second secure non-volatile memory having decryption key information stored therein, a second display, a second power near-field communications antenna and a second data near-field communications antenna. The method is comprised of the steps of performing verification of a first user, transmitting a verification request from the first mobile communications device to the second mobile communications device using the decrypted application on the first mobile communications device, performing verification of a second user, transmitting the encrypted verification reply from the second mobile communications device to the first mobile communications device using the decrypted application on the first mobile communications device; decrypting the encrypted verification reply in the first secure token; verifying in the first security processor an identify of the second user From the decrypted verification reply and displaying on the first display a result of the verification of an identity of the second user.

The step of performing verification of a first user comprises the steps of powering the first secure token with energy received through the first power near-field communications antenna from the near-field communications reader in the first mobile device, enabling the first secure token as a master device relative to the first mobile communications device, enabling the first mobile communications device as a servant device relative to the first mobile communications device, executing a cryptographic mutual challenge response algorithm between the first secure token and the first mobile communications device, unlocking first authentication data of the first user in the secure token in response to successful execution of the cryptographic mutual challenge response algorithm, prompting a first user to enter authentication data through the interface in the first mobile device, transmitting authentication data entered by the first user through the interface in the first mobile device to the first secure token through the first data near-field communications antenna, comparing in the first secure processor authentication data received from the first mobile device with the unlocked authentication data, generating on the first display an indication of a result of the comparing, unlocking a first private decryption key associated in the first secure memory with the first user, transmitting the first private unlock key from the first secure token to the first mobile device through the data near-field communications antenna and decrypting an encrypted application stored on the first mobile communications device using the first private unlock key received from the first secure token.

The step of performing verification of a second user comprises the steps of powering the second secure token with energy received through the second power near-field communications antenna from the near-field communications reader in the second mobile device, enabling the second secure token as a master device relative to the second mobile communications device, enabling the second mobile communications device as a servant device relative to the second mobile communications device, executing a cryptographic mutual challenge response algorithm between the second secure token and the second mobile communications device, unlocking a user's authentication data in the secure token in response to successful execution of the cryptographic mutual challenge response algorithm, prompting a second user to enter authentication data through the interface in the second mobile device, transmitting authentication data entered by the second user through the interface in the second mobile device to the second secure token through the second data near-field communications antenna, comparing in the second secure processor authentication data received from the second mobile device with the unlocked authentication data, generating on the second display an indication of a result of the comparing, unlocking a second private decryption key associated in the second secure memory with the second user, transmitting the second private unlock key from the secure token to the second mobile device through the data near-field communications antenna, decrypting an encrypted application stored on the second mobile communications device using the second private unlock key received from the second secure token and generating in the second secure token an encrypted verification reply.

The authentication data comprises one of a password template and a biometric template, where the biometric template can be any known biometric such as facial recognition, iris recognition, fingerprint or DNA.

The method may further comprise generating and displaying on the first display on the first secure token a status message in response to successful execution of the cryptographic mutual challenge response algorithm between the first secure token and the first mobile communications device.

The method may further comprise any or all of the steps of establishing a secure phone call in response to a verification in said first security processor of an identify of said second user from said decrypted verification reply, generating an audit file in said first secure token in response to said establishing of a secure phone call and storing said generated audit file in said first secure memory, generating an audit file in said second secure token in response to said establishing of a secure phone call and storing said generated audit file in said second secure memory and performing a financial transaction between said first secure token and said second secure token in response to a verification in said first security processor of an identify of said second user from said decrypted verification reply.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

The preferred embodiments of the inventions are described with reference to the drawings. In a preferred embodiment, the present invention provides a system and method for secure peer-to-peer communications and transactions using a plurality of advanced security tokens as cryptographic unlock keys for mobile devices. In the present description, the advanced security token or card is referred to as a "Cryptographic Key Mobile Unlock Token" or "CK Token."

Figure 1A:
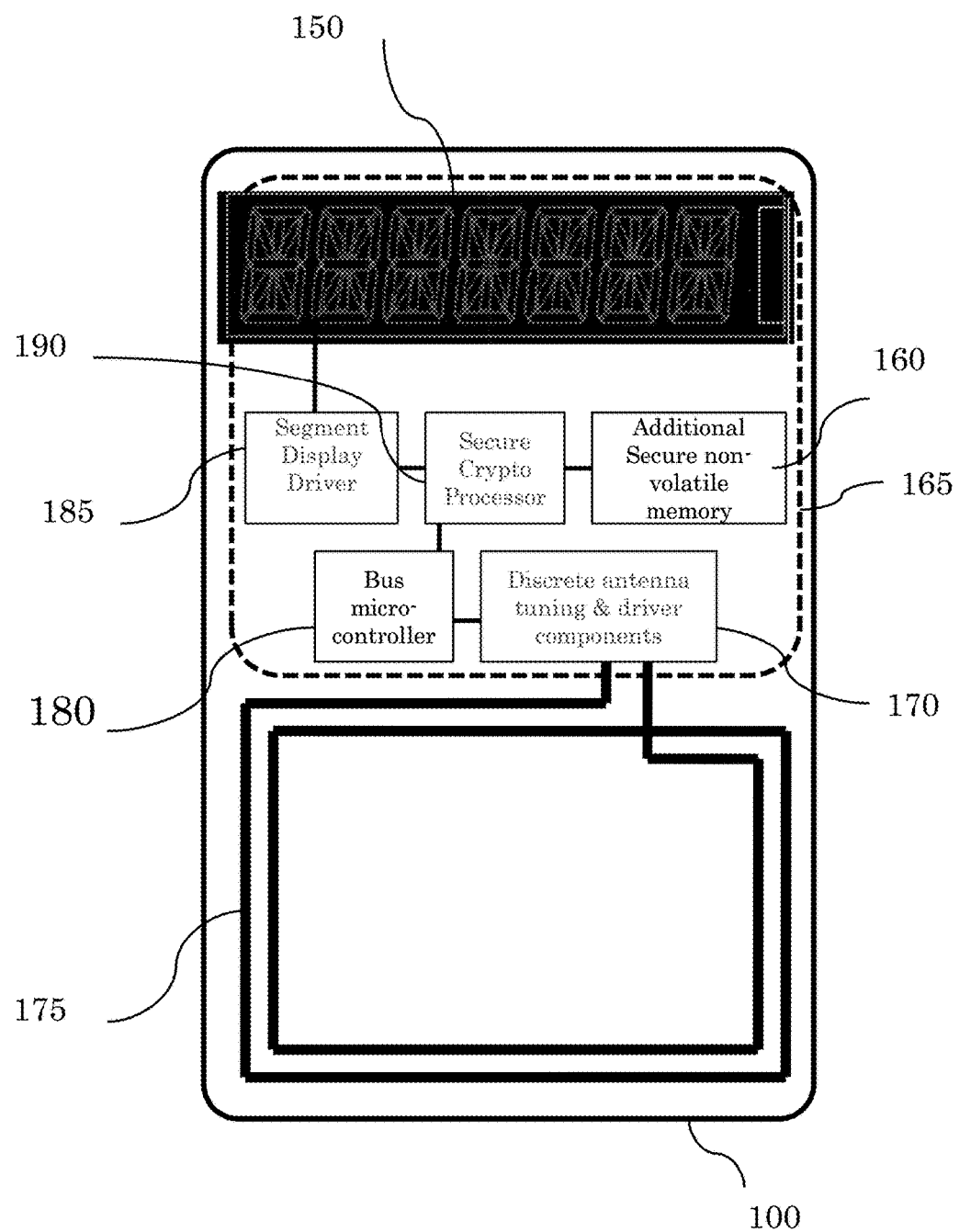
FIG. 1A is a block diagram illustrating a preferred embodiment of a cryptographic key (CK) token in accordance with the present invention.
Figure 1B:
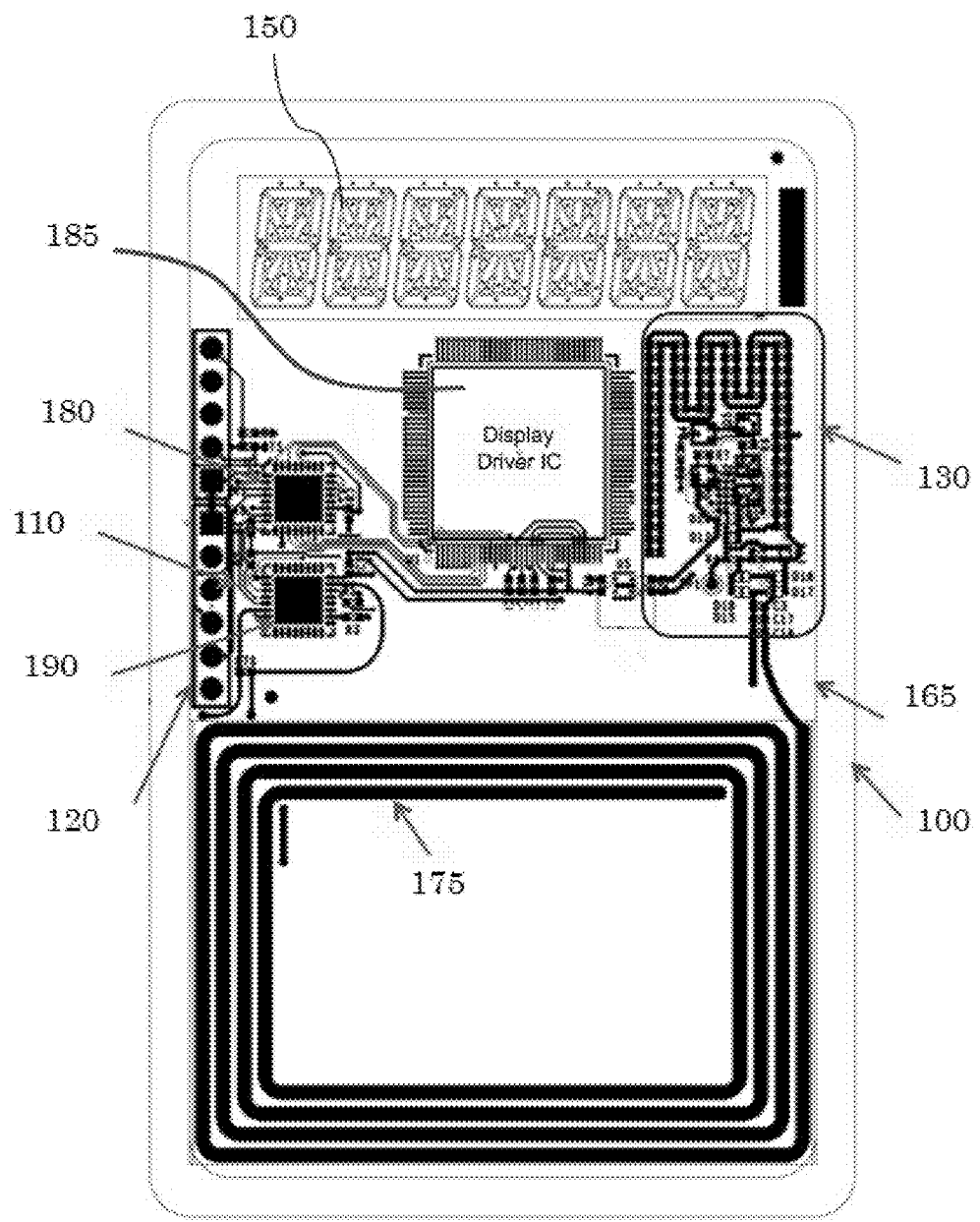
FIG. 1B is a circuit diagram illustrating a front side of a preferred embodiment of a CK token in accordance with the present invention.
Figure 1C:
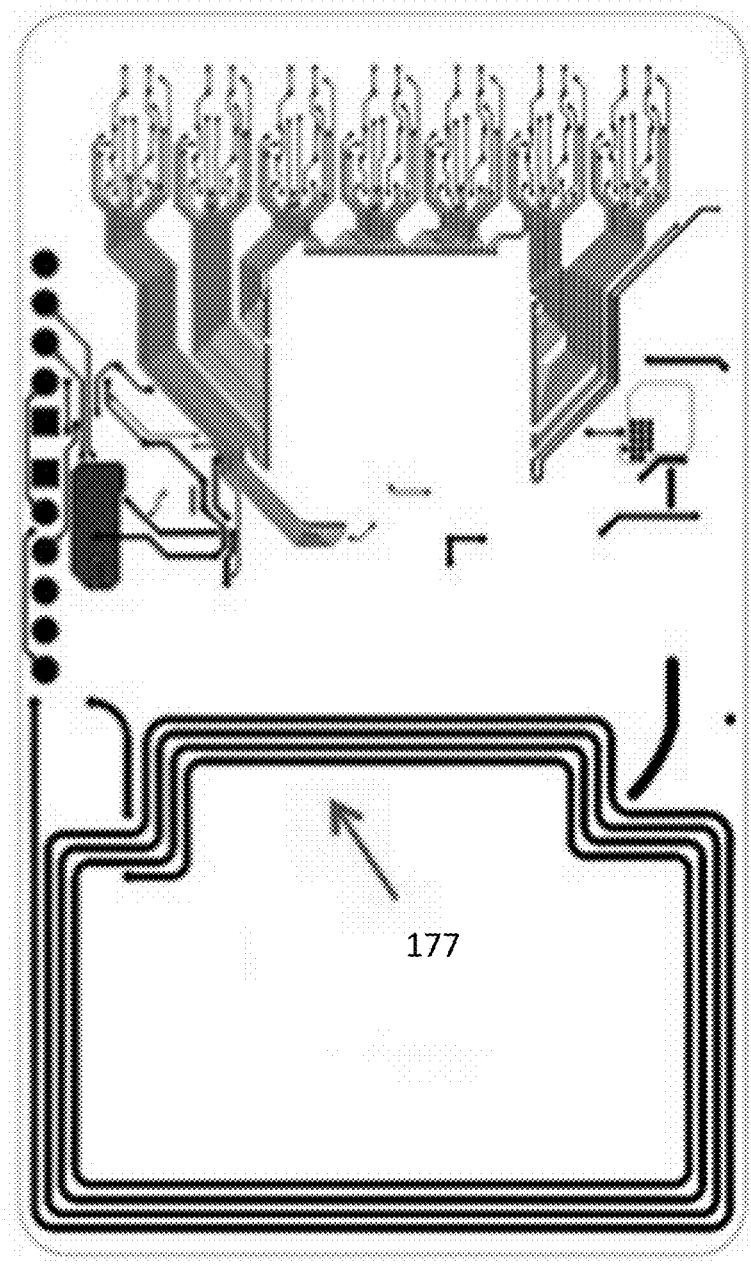
FIG. 1C is a circuit diagram illustrating a backside side of a preferred embodiment of a CK token in accordance with the present invention.

As shown in FIGS. 1A-1C, the CK token design uses several integrated circuits (IC's) placed on a very thin printed circuit board. The bus controller processor or microcontroller 180 acts a security firewall to prevent unwanted access to the data bus between the cryptographic processor 190, trusted memory 160, display driver 185 and display 150. The antenna 175, 177 can be one power antenna and one data antenna, respectively, but antenna 175 also can be more than one power antenna to optimize the power coupled into the CK token. The card 100 includes interface 110, test and programming port 120 and energy harvesting circuitry 130. Additional memory (not shown) can also be added behind the processor if needed. The CK inlay or PCB inlay 165 is sized to fit into a smartcard 100 and/or label that, for example, may be attached to the back of a smartphone, watch or any other mobile device. The CK token integrates a programmable security processor 190 to be easily adaptable to any mobile device. Since cryptographic security processors require more power than general purpose processors, additional power management and harvesting is required. The CK token designs optimizes power coupling with multiple near-field communications ("NFC") card antennas, employs an energy harvesting circuitry 130, a uses a more efficient power management unit. These design features will be described in more detail below.

In a preferred embodiment, all of the cryptographic functions required are implemented while parasitically coupling all power through only the mobile device. Having a supplemental battery with the CK token severely limits the life of the token, lowers reliability, and increases costs.

In a preferred embodiment, simple short messages—all alpha numeric—are displayed. The 13-segment display 150 should suffice, but the invention is by no means limited to such a 13-segment display. The majority of the time, a single line message is enough. In some instances, a scroll like message may be required. In all cases these feedback messages are executed only from the secure processor 190. It is for this reason that bus isolation and the CK token acting as master device is mandatory.

One design aspect of the CK token is to ensure enough power is coupled into the CK token to execute the cryptographic functions and bi-state display. The power challenge has many variables that effect the relative powered coupled into the CK token including scanning distance, antenna geometry, speed, angle, and widely varying smartphone NFC transceiver power strength.

A large number of factors affect scan distance performance. One of the most common misconceptions is that the larger the antenna (aerial), the better the performance. When using mobile phones to read NFC tags, this is usually not the case. A larger antenna often requires more energy and therefore the phone needs to be closer. A second factor is the antenna design which in many cases, such as key fobs or wristbands, may be restricted. Further, in much the same way as mobile phones have different battery performances, there are significant differences in chip performance and the energy required to power them. The greater the energy required, the closer the energy source needs to be.

As an example, executing cryptographic functions within the A7005 chip and displaying the results on the CK Token display can draw a maximum of 27 mW of power. This is close to the maximum limits the mobile device reader. To insure safe reliable power margins without employing a costly supplemental on-card battery, the CK token design preferable integrates multiple NFC antennas, power harvesting and power storage circuitry and a software and hardware based power management module.

In a preferred embodiment, the CK design employs two antennas 175, 177. The size, geometry and tuning were all considered. The maximum coupling power was achieved by matching the antenna to the geometry used in the smartphone and employing two (2) NFC on card antennas Matching Smartphone Antenna Geometry—In an example, a test smartphone was the Samsung S5, so the CK power-coupling antenna was matched in geometry, length, & width to the phone geometry. Antenna alignment between the smartphone and token will also be important. For example, the CK token antenna alignment with the Samsung S5 would configure the smartphone in the landscape mode with the card display revealed from the back for the user to ideally see the results of the secure processing being executed within the CK token.

To perfectly align the card antenna to the mobile device antenna, a simple Velcro™ rubber or plastic guide was attached to the back. This assured optimal antenna alignment for power coupling and ease-of-use.

Other mobile phones or tablets can be pretested to determine where the back-side card guide should be placed. Since the display is designed to be software configured to be orientated to be read facing up or flipped upside down, the card guide can be placed on any 4 sides of the mobile device and be easily read.

The card display could also change orientation to make it readable to the user automatically by using passing the accelerometer sensor data from the mobile device.

Employing two (2) NFC on card antennas—The inductive type antenna of the 14443 NFC standard easily allows multiple antennas without interference to couple more power into the CK token. Multiple antennas also require redundant trimming circuitry adding extra discrete capacitors and resistors. In addition more complex power conditioning circuits are required.

Figure 4:
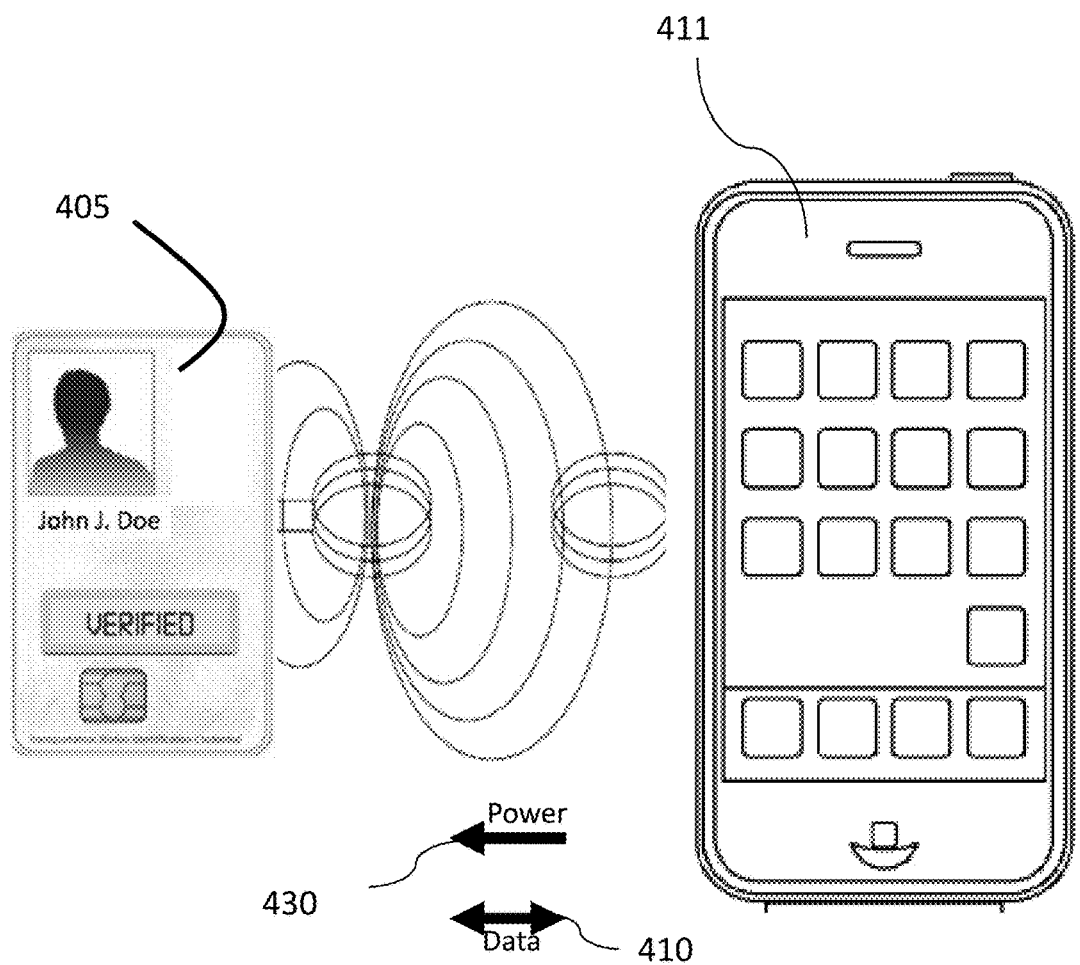
FIG. 4 is a diagram illustrating operation of a CK token and a mobile device in accordance with a preferred embodiment of the present invention.

A preferred embodiment of the present invention employs two (2) antennas 175, 177. The thicker NFC antenna 175 on the front side is used only for power rather than modulating the data input/output off the side peak of 13.56 MHz center frequency. On the obverse side, the CK token integrates a second antenna 177 only for the data channel. Using this two-antenna design configuration, both the power coupled into the CK token and the channel data rate will be optimized. As shown in FIG. 4, the two antennas in a CK token or card 405 enables the card to be coupled to a mobile device 411 such as a mobile phone with the mobile device 411 transmitting power 430 to the token or card 405 through the antenna 175 and the token or card 405 and mobile device 411 transmitting data 410 to one another through the antenna 177.

The CK layout includes an analog energy harvesting circuit 130. This circuitry is capable of collecting additional power by pre-charging up to 50 capacitors placed in parallel in the "snake like" structure. Note that one to 50 capacitors can be placed if required. The energy harvesting/charge storage circuitry 130 may not be needed to power and execute required security functions in the CK Token. It is added to lower risk. The energy harvesting circuit 130 can be modified and can also be removed from the PCB design or bypassed.

Power can be managed through software on the CK Token. Powering the segment driver integrated circuit 185 and cryptographic integrated circuit 190 at the same time can result in a power draw that came near or exceeded what the smartphone could produce. If that occurs, a token can lock up or fail to stop communication with the smartphone.

A work around for intermittent token failure was to reprogram the cryptographic firmware so that every processor execution would happen in serial rather than in parallel. For example, if the token required to execute a password match algorithm, the code would serial execute the processes of decrypting the password template from memory, then transferring and decrypting the "live" password form the smartphone, followed by then executing the matching of live vs. template passwords. The matching results would initiate a low powered setting within the crypto processor before powering up the segment driver integrated circuit to write the results to the bi-state display.

With the CK token design, a more complex security architecture can be implemented. Many more cryptographic functions of the cryptographic library can be exercised utilizing the several on-chip crypto math-coprocessors. Since these math coprocessors are not fully characterized with respect to overall chip power draw, integrating the new security architecture will introduce an unknown risk due to possible power consumption. It is for this reason that the CK token has developed a layered design approach to optimize power coupling to the mobile device.

This design uses memory to protect user's data that can be partitioned to separate data containers 224, 225, 226, 230. These memory containers can be encrypted with separate algorithms and cryptographic keys and can be managed by different entities. In addition, the memory containers have attributes fields linked to each container that dictate whether the containers are read/write, what level of user authentication is required, and what level of authorization is required for access. The user's CK's and smartphones, for example, may be initialized and provisioned with cryptographic keys by a separate trusted authority using robust certificate based systems.

Figure 2:
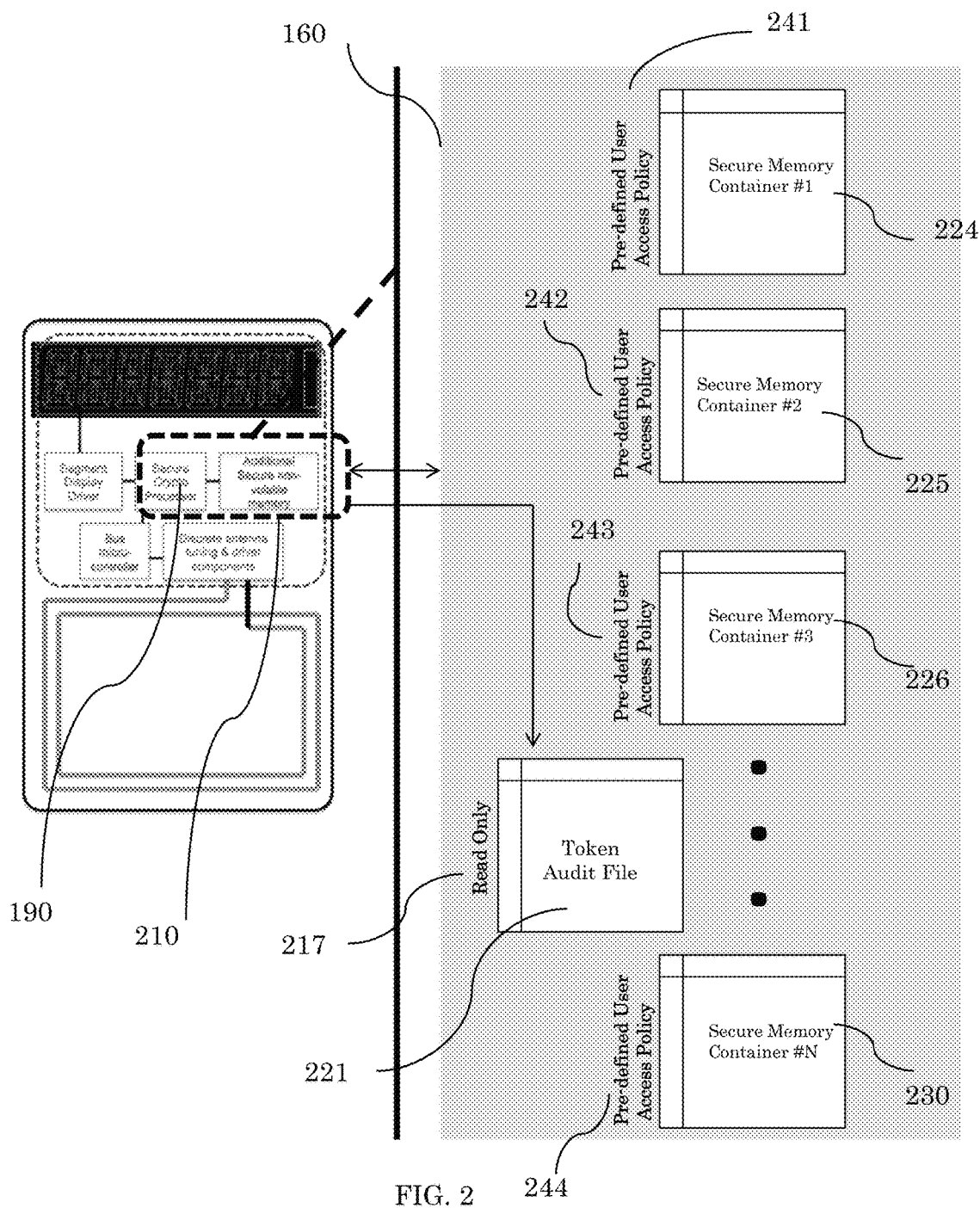
FIG. 2 is a diagram illustrating a preferred embodiment of a memory structure of a CK token in accordance with the present invention.

As shown in FIG. 2, the security features 210 of the present invention include the secure processor 190 and the additional secure non-volatile memory 160. The additional secure non-volatile memory 160 may include a plurality of secure memory containers 224, 225, 226, 230 for storing pre-defined user access policies including current certificate revocation lists. An additional security component of the secure memory containers is the read only audit file 217. This memory records any transaction between the token and smartphone device and securely writes a log entry into the container. The audit data container cannot be modified and can be used as an independent audit file as a backup to the network audit or as a buffer if the mobile device does not have a connection to the network at that time. It can be downloaded by an authorized security manager.

Figure 3:
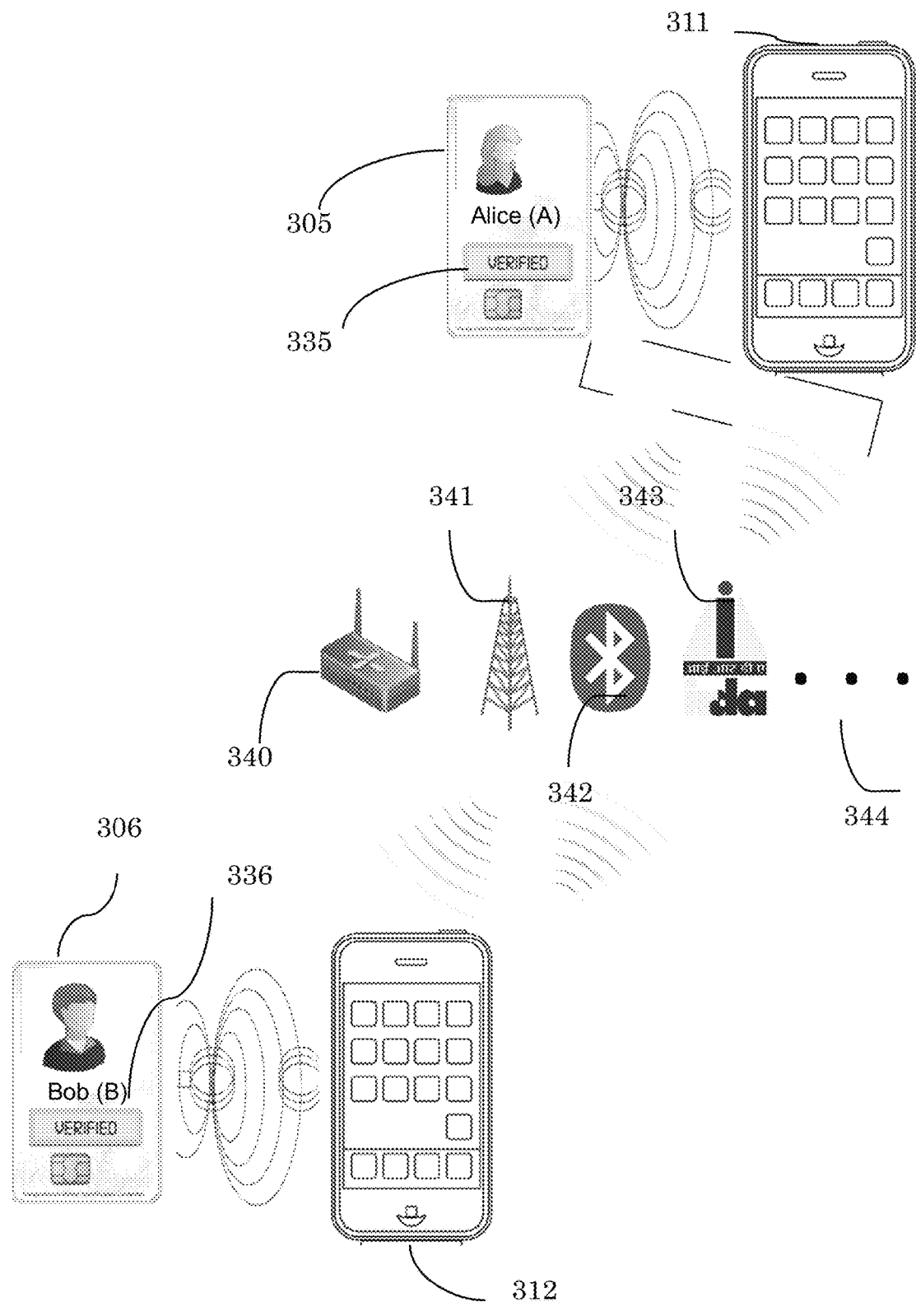
FIG. 3 is a diagram illustrating operation of a preferred embodiment of a system and method in accordance with the present invention.

This CK token has unique advantages when used peer-to-peer between two users. It should be noted the tokens can use any network pathway as shown in FIG. 3. In the example shown in FIG. 3, a first CK token 305 owned by Alice has a display 335. The first CK token 305 is coupled with mobile device 311, which may be, for example, a cell phone, through the antenna in the token. A second CK token 306 owned by Bob has a secure display 336 and is coupled to a mobile device 312 via the antennas in the token 306. Secure signals between the mobile devices 311 and 312 can be made through any electronic mobile communications link such as a router 340, a cell tower 341, Bluetooth 342, data link 343 or any other system 344 ensuring that confidential information can be passed between the two CK's and associated displays without being revealed along the way.

With secure tokens of the present invention coupled with mobile devices such as mobile phones, secure peer-to-peer communications and transactions may be performed. For example, a secure phone application can establish an authenticated link between two Smartphones, perform an exchange of credentials to be displayed on each CK token Secure Display such that each party knows whom they are talking to and the mutual level of authorization between the two.

For example, in a military context if one user holds a SECRET clearance and the other holds a CONFIDENTIAL clearance, they each would then know that a secure conversation could be held at the CONFIDENTIAL level, the highest level of mutual authorization. This operation can also be used to display contents of each participant's secured Card memory on the other's secure display i.e., "wallet or Debit Card contents" in a Stored Value application or secure text in a data transaction. Finally, with the appropriate commands, funding can be securely downloaded from one Smartphone Card to the other using this connection.

Figure 10:
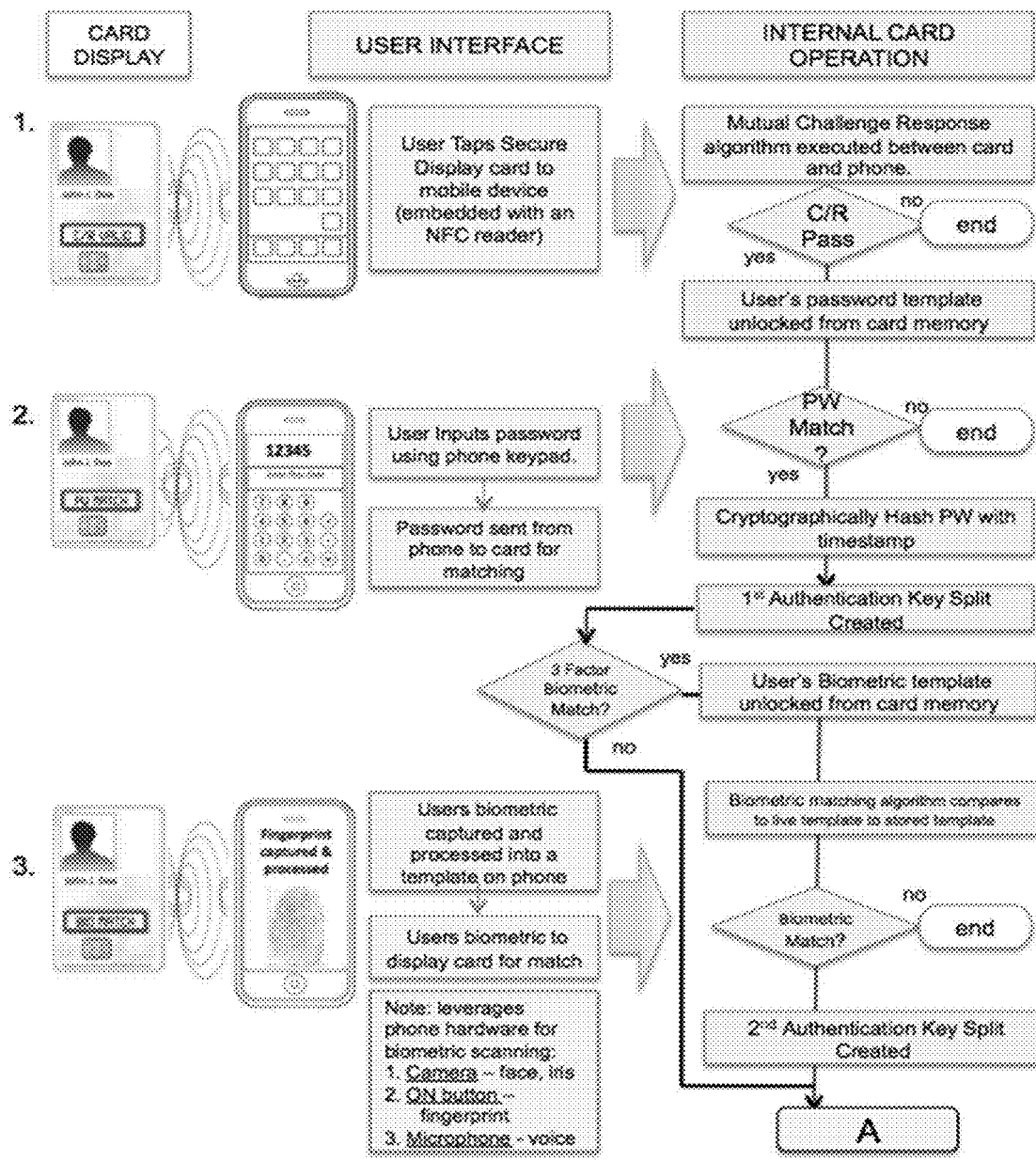
FIG. 10 is a flow diagram illustrating operation of a CK token and mobile device in accordance with a preferred embodiment of the present invention.
Figure 11:
FIG. 11 is a diagram of a mobile device coupled with a CK token performing authentication in accordance with a preferred embodiment of the present invention.
Figure 12:
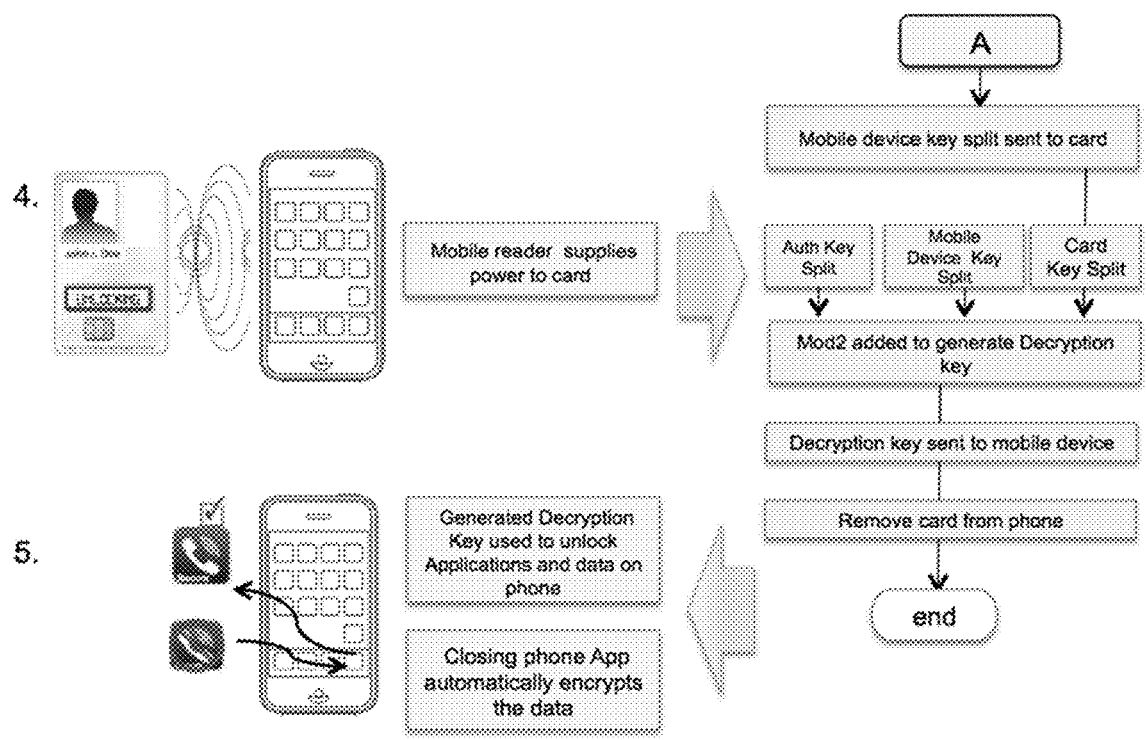
FIG. 12 is a flow diagram illustrating operation of a CK token and a mobile device in accordance with a preferred embodiment of the present invention.

A method of a preferred embodiment of the present invention for establishing a secure peer-to-peer connection is described with reference to FIGS. 5-6. Further details are shown in FIGS. 10-12. The process is initiated by User A (Alice) by presenting (502) her CK token to her mobile device, which may be a smartphone or other device. The CK token typically must be placed (504) within approximately 15 cm for the CK token or card to be energized by the NFC reader in the mobile device. Once the CK token is energized (506), the CK token is enabled (508) as the master device and the mobile device is enabled as the slave or servant device (509). A cryptographic mutual challenge response algorithm (MCR) is then executed on the CK token (510) and CMD (512) to validate the mobile device (CMD). If the mutual challenge response is not successful, the process ends (514). If the mutual challenge response is successful, an indication such as an audible sound or visual indication on the mobile device or CK token is generated (516) to advice the user (Alice) that the CK token and mobile device have been authenticated.

In response to this successful authentication, the user's password and/or biometric data are unlocked from the CK token's secure memory (518). The user is then prompted (520) on the mobile device. Such a prompt may be for a password or scan of biometric data (522). Examples of such prompts are shown in FIG. 11. The password or biometric data entered by the User on the mobile device are pre-processed and encrypted (524) and are sent to the CK token, which executes final authentication of the User (526). In the CK token secure processor, the User's entered password or biometric data is compared (528) to the data previously unlocked from the secure memory in the CK token. If the User's password or biometric does not match the unlocked data, a message such as "Incorrect PIN" is displayed on the display of the CK token (530) and the process either ends or the User is prompted to re-enter the data through the mobile device and the final user authentication is repeated. Typically, a User would have some limited number of tries to enter correct data after which the CK token and/or mobile device could be locked either for a period of time or until being re-set through a network. If, on the other hand, the entered password or data matches the unlocked data, a message such as "PIN Matched" or "Authenticated" or other message is displayed (532) on the CK tokens display.

In response to the final authentication of User A being completed, the User's private encryption key is unlocked from the CK token secure memory (534), a key split is generated (536) on the mobile device and the key split is sent (537) to the mobile device. The CK token then generates (538) a session key, which is sent to the mobile device. The User A then selects an encrypted application ("iCON") on the mobile device. The mobile device then uses the session key to decrypt and open (540) the secure application iCON on the mobile device. When the secure application iCON later is closed (542), the secure application iCON is re-encrypted on the mobile device including any modifications and the CK token's working memory and registers are cleared (546).

The interaction between User A's mobile device and CK token during the authentication and exemplary messages shown on the CK token display are shown in FIG. 10. In Step 1, at the completion of a mutual challenge response, the CK token display indicates "C/R VALID" to indicate to User A that the mutual challenge response has been successful. In the example shown in FIG. 10, User A's password template is unlocked in the CK token in response to the successful mutual challenge response. In Step 2, User A enters the password through a user interface in the mobile device. IF the password is a match with the unlocked password template, the CK token display indicates, for example, "PWD MATCH." In the CK token, the password is cryptographically hashed with a time stamp and $1^{st}$ authentication key split is generated. In Step 3, the user is prompted for a biometric scan through the mobile device. Any biometric such as facial recognition, iris scan, fingerprint or voice recognition may be used. The biometric verification is performed in the CK token. If successful, the CK token generates a $2^{nd}$ authentication key split.

The secure application being unlocked on User A's mobile device could be any of a variety of applications such as a secure Notes application, a secure voice call application, or a secure text message application. The flow chart in FIG. 6 illustrates a continuation of the method of FIG. 5 when the secure application is one requiring secure peer-to-peer communications. Once User A (Alice) opens the secure voice call application on her mobile device, her mobile device sends (602) a verification request to User B's (Bob's) mobile device. The verification request sent from User A to User B includes a public decryption key to initiate the process on User B's mobile device and CK token. User B's CK token must include in its secure memory a private decryption key corresponding to the public key in order to decrypt the request. The private key is pre-programmed into User B's CK token secure memory prior to the exchange between User A and User B.

Figure 5:
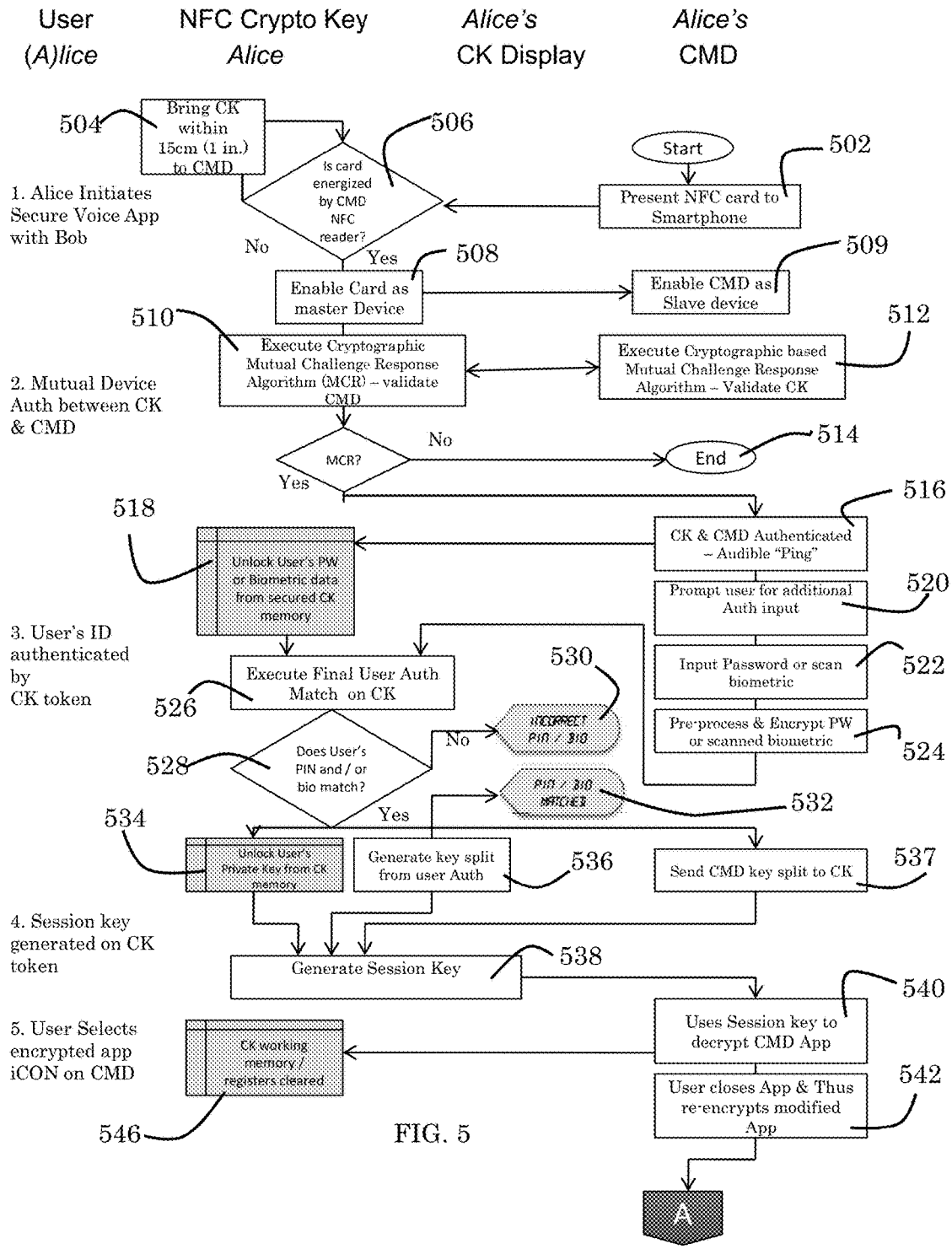
FIG. 5 is a flowchart of a token and mobile device unlocking an encrypted application stored on a mobile device in accordance with a preferred embodiment of the present invention.
Figure 6:
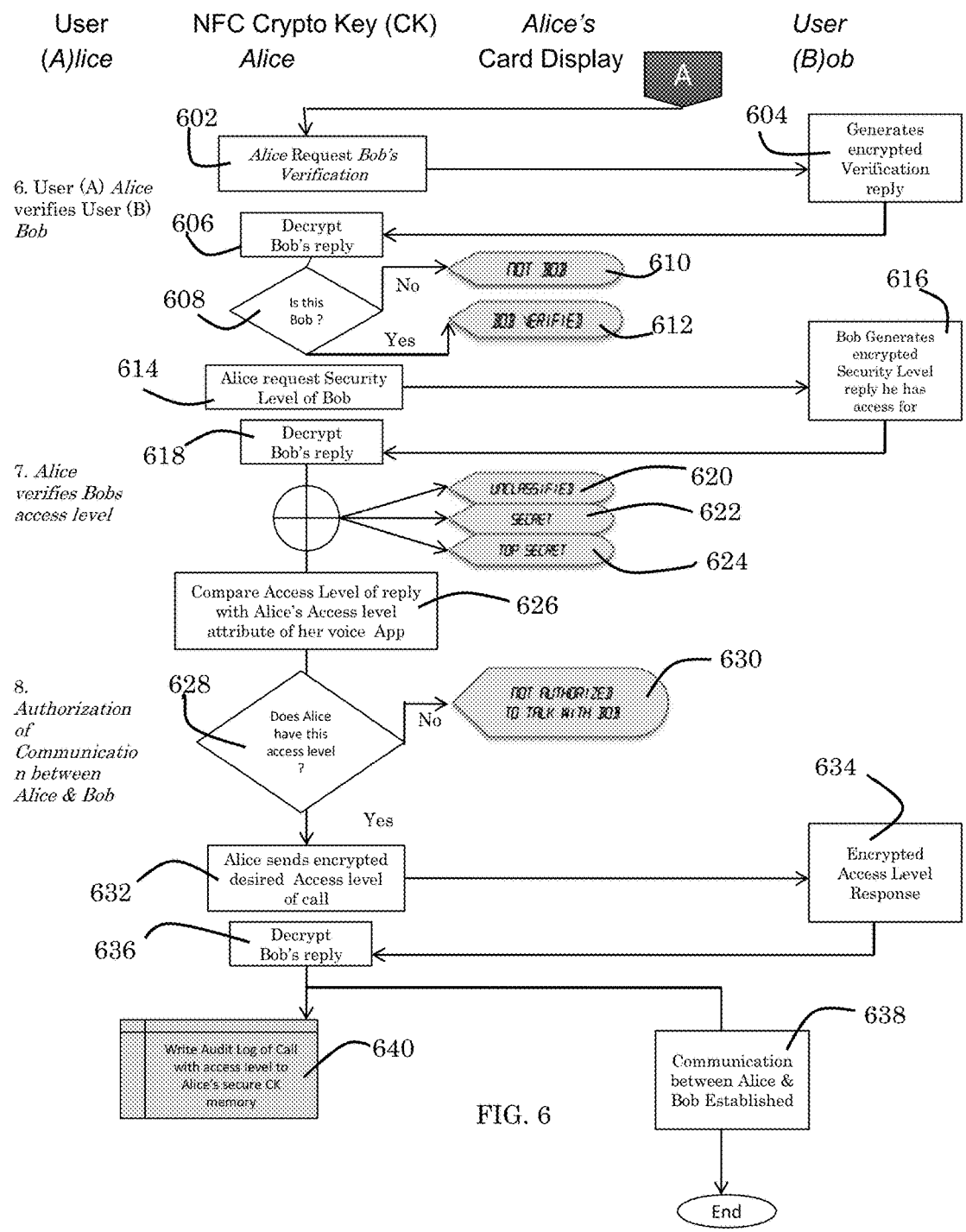
FIGS. 6 is a flowchart of authentication and authorization of a second user and CK token using a software encrypted voice application on a mobile device in accordance with a preferred embodiment of the present invention.

Upon receipt of the request, User B's mobile device prompts User B to initiate the process shown in FIG. 5 and described above with User's B's CK token and mobile device. Once the secure communications application is decrypted on User B's mobile device at step 540, however, User B's CK token generates (604) an encrypted verification reply and sends that reply to User's A's mobile device. User A's mobile device receives (606) the encrypted verification reply.

Once User A's mobile device receives the verification reply, User's A's CK token uses secure data, such as a private encryption key, to determine whether User B has been verified. User A's CK token will generate on its display a message indicating either that User B has not been verified (610) or that User B has been verified (612). In a system having only one level of security for users, communications between User A and User B can now be established. If the system has multiple levels of security, User A's CK token or mobile device generates a security level request (614) and sends that request to User's B's mobile device, which in turn requests that information from User B's CK token. User B's CK token generates an encrypted security level reply (616), provides that reply to User's B's mobile device, which send it to User A's mobile device. User's A's mobile device receives User B's encrypted security level reply, sends the encrypted reply to User A's CK token, and User A's CK token decrypts (618) that reply. User A's CK token then generates and displays on its display an indication 620, 622, 624 of User B's security level. User A's CK token then compares (626, 628) the received security level of User B to User A's security level attribute for the particular application. If User A's security level does not match User B's security level, User A's CK token displays (630) a message indicating that User A is not authorized to communicate with User B through the secure application. If User A's access level matches User's B's access level, User's A's CK token generates an encrypted desired access level request and through User A's mobile device sends that request to User B's mobile device (632). In response to receiving the encrypted access level request through User B's mobile device, User B's CK token similarly performs steps 618-632 with respect to User A's security level. If User B's CK token determines that the User A's and User B's security levels both match the requested access level, User B's CK token generates a decrypt reply and send that reply through User B's mobile device to User A's mobile device. If that reply indicates a positive match, communications between User A and User B are initiated between User A's and User B's mobile devices (638) with the security level of the call shown on each user's secure display. User A's and User B's CK tokens then write an audit log of the call with the access level to their respective secure memories.

Figure 8:
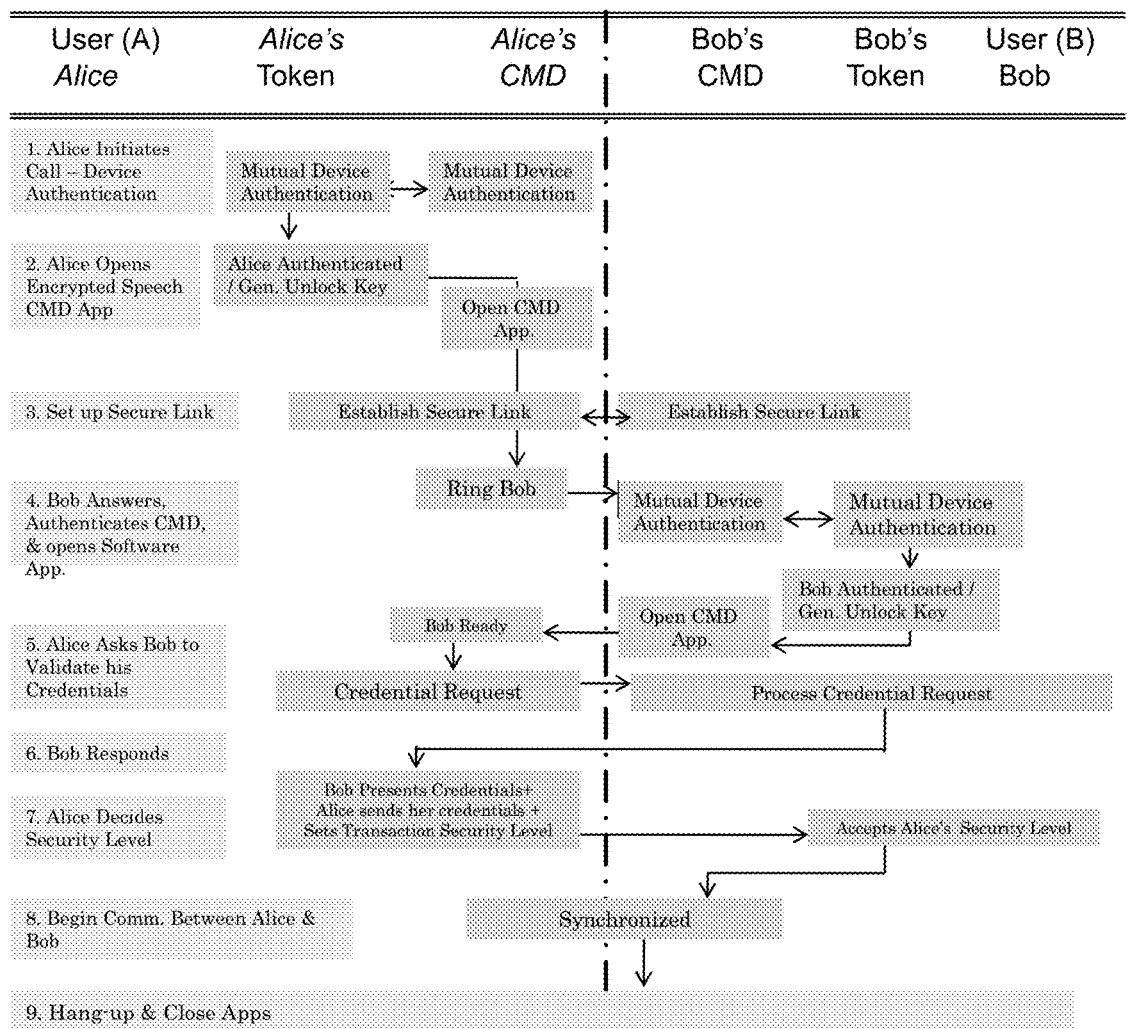
FIG. 8 is a protocol exchange between two peer-to-peer users (Alice & Bob) using a software encrypted voice application on a mobile device in accordance with a preferred embodiment of the present invention.

This peer-to-peer secure communication link is shown from a different perspective in FIG. 8 with the different actions in different columns to show where the various action are taking place. Thus, in step one, User A initiates the method, for example for a secure call, by placing her CK token within range of the NFC reader in her mobile device, which starts the mutual authentication between User A's CK token and mobile device. Once the mutual authentication is successfully completed, in step 2 an unlock key is generated on User A's CK token and the encrypted application is opened on User A's mobile device.

Figure 7:
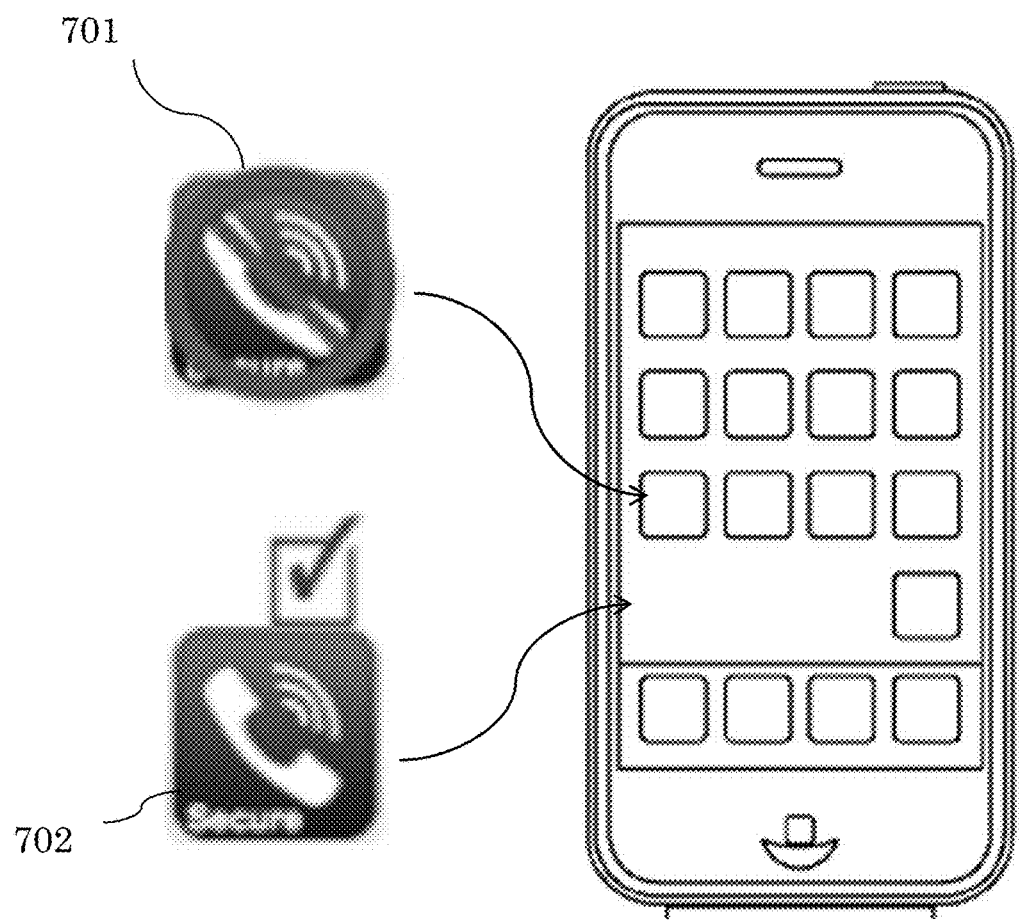
FIG. 7 is a diagram of a mobile device coupled with a CK token in accordance with a preferred embodiment of the present invention.

With the secure application open on User A's phone a secure link is initiated and established between User A's mobile device and User B's mobile device. In step 4, User B's mobile device rings or provides any other indication of an incoming call. User B placed his CK token within range of the NFC ready in his mobile device and mutual authentication is performed between User B's CK token and User B's mobile device. If that mutual authentication is successfully completed, User B is authenticated and User B's CK token generates an unlock key that is used to open the encrypted speech application on User's B's mobile device. In step 5, User B's mobile devices sends an indicator to User A's mobile device indicated that User B is ready. In response, User A's mobile device send a credential request to User B's mobile device. User B's mobile device and CK token process the credential request presents User B's credentials back to User A's mobile device. In step 7, User A's CK token and mobile device set a transaction security level and send User A's credentials and the set transaction security level to User B's mobile device. User B's CK token determines whether the set transaction security level can be accepted. If it is accepted, in Step 8 the mobile devices are synchronized and the communications begin. As shown in FIG. 7, User A's and User B's mobile devices may show indicators on their screens providing a visual indication of the security level of the call. In step 9, the call is completed and the apps are closed. As described previously, an audit record of the call is created in User A's CK token and is stored in the secure memory in the CK token. An audit file also may be created in User B's CK token and stored in its secure memory. Further, throughout the process, the displays on User A's and User B's CK tokens can show the status of the various stages of the process.

Figure 9:
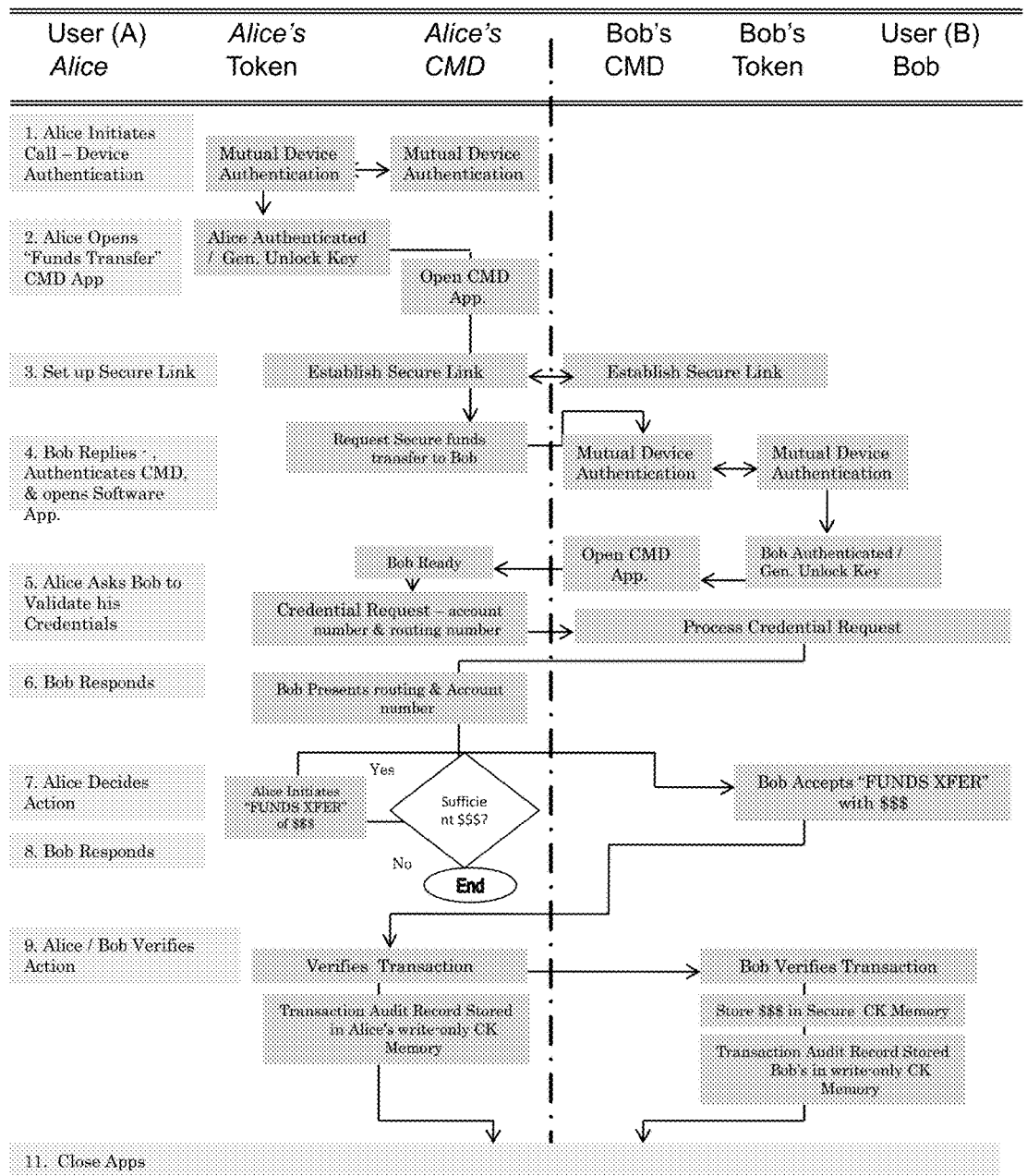
FIG. 9 illustrates a protocol exchange between two peer-to-peer users (Alice & Bob) to securely transfer funds using CK tokens and smartphones in accordance with a preferred embodiment of the present invention.

An alternative embodiment for a peer-to-peer mobile funds transfer is shown in FIG. 9. The process is very similar to that shown in FIG. 8 and described above, and in fact Steps 1-3 are the same. At Step 4, however, rather than ringing User B's mobile device, User A's mobile device and CK token send a request for a secure funds transfer to User B. In this instance a funds transfer from User A to User B is shown, but those of skill in the art will understand that the method could be modified such that User A can request a funds transfer from User B instead. In Step 5 of the secure funds transfer example in FIG. 9, the credential request sent by User A's CK token and mobile device includes payment details such as an account number and/or routing number. Once the credential request is successfully process by User B's mobile device and CK token in Step 5, User B's mobile device and CK token send the requested payment information to User A's mobile device and CK token. In Step 7, User A's CK token determines whether User A has sufficient funds available to cover the fund transfer. If no, the transaction ends without payment. If yes, in Step 9 User A's CK token and mobile device verify the transaction and send a message to User B's mobile device and CK token that the transaction has been verified at User A's devices. User B's mobile device and CK token then verify the transaction on User B's end. User B's CK token then stores the received funds in its secure memory and generates and audit record and stores that record in the write-only memory in User's B's CK token memory. User A's CK token likewise creates and audit record of the transaction and stored the record in write-only memory in User A's CK token. In Step 10, the transaction is completed, the applications are close don User A's and User B's mobile devices and any secure files are re-encrypted.

Note that this trust level created with the system and method of the present invention cannot be created using traditional Smartcards since none of these have implemented a Secure Display, the essential and only mechanism for validating the applications described so far. The Secure Display provides the visual guarantees to the user, ones that he can trust.

Remote Transaction Use-Cases

Cross validation of credentials for each party in an end-to-end transaction is very important in remote transactions in which sensitive information may be involved. In the typical secure mobility architectures, cross validation of credentials is managed and executed entirely by the network authority. This server centric approach requires a more complex provisioning, monitoring, and credential validation system. Not only does this security architecture require the server to act as an intricate security component of the solution, it mandates significant trust with the commercial mobile device. Since the CK token of the present invention is a self-contained crypto module, the smartphone coupled to the token or card now has a much reduced security requirement. Additionally, key security functions done by the trusted server like credential validation, authorization, and access privileges are now executed by the token.

In this peer-to-peer scenario, assuming a closed network, each user uses their CK token with a smartphone to authenticate, authorize, and validate each other credentials in lieu of a trusted network service executing these security functions. Each party presents his own credentials in such a way that both can agree on a common level of trust. This allows them to exchange information at that level of trust. The specific trust level is predetermined during enrollment and provisioning of the cryptographic keys. Cryptographically validating the party on the other end and their trust level and their privileges is defined as "authorization."

Authorization can be statically linked to the user by appending it as an attribute field during the provisioning of the card, phone, and trusted applications. The flow chart shown in FIGS. 6A-6B details how a static authorization process occurs between two different users without communications with any network authority. This example highlights how the CK token can unlock a software encrypted voice application and users on each can securely verify each other and their level of access. This is a new unprecedented peer-to-peer feature of the present invention.

Authorization can also be dynamic. In some instances, the enterprise authority would have the ability to ratchet up and down a user or group of mobility users. Each user token still validates the other's credentials and level of trust as in the static case, but then would require reaching back to the network for communication to be enabled. This is a simplistic process for server. The server can now seamlessly overlay any dynamic access rules depending upon variables like, threat level, location of the user, time of day, coalition partner status, and network congestion. Whether static or dynamic authorization is applied, the CK token provides the trusted end point hardware to securely execute these functions.

The many broader uses and features of the CK token with a smartphone can be further explained with these five (5) classes of use-case examples.

Use Case 1: Software Secure Speech App on Smartphone—

Initiating a secure speech session in which each party has at least the same access privileges. In a military scenario the two speakers could determine that one is cleared to the Secret and the other to Confidential, which would mean they could conduct the conversation at the Confidential level. This can be equivalent to each of the speakers recognizing the voice of the other and knowing security levels from previous contacts. The CK token augments this human centric authorization process with an electronic validation based executed on each user's CK tokens.

One key area that makes secure mobile speech more robust is improving the authentication of the user on the other end (and their level of access privileges) with high mathematical certainty before transfer of any sensitive information.

Use Case 2: Student Taking an On-Line Course

After registering with the school for the course, validation of which is contained on the student's CK token, the student could then remotely access the course at any time on-line by presenting his identity credential followed by his course registration credential. Both of these are contained securely on his CK token, residing in the secure memory of the Card and therefore can be totally trusted.

The course instructor examines these remotely via Smartphone, the course admittance requested and granted with a password passed to the student for use in accessing the course on-line. There is no possible fraud in this transaction with the student knowing that he is getting access to an authentic course, which can be proven at a later time via the audit trail on his CK, and the instructor knowing his fee has been paid and that the student is who he says he is. Although this Use Case is not outlined in the flow diagrams like the secure voice, file unlocking, and funds transfers, it requires the exact same set of security functions by the Instructor/student token. In fact, the only difference is the type of private data that is being protected.

Use Case 3: Transferring Funds Using Smartphone

Assured transfer of funds is also possible with the CK token-to-Smartphone-to-CK token configuration. Consider a money transfer from one Debit card to another via this connection. Needed is authentication of the Card holders and authorization for one card to pass the funds and the other card to accept them.

The authorization of the sender involves assurance that the card credit limit has not been exceeded and on the acceptors end that he is the intended recipient. The CK token features of the present invention will allow this transaction to occur in a trusted manner. The CK token has the unique capability to address the authentication, authorization, and electronic verification that correct amount of funds have been transferred to the right person. This Use Case protocol exchange between the smartphones users is detailed further in FIG. 4.

Use Case 4: Verifying Funds Transferred

A variation on the funds transfer application is that the sender can also examine the contents of the acceptor's secure memory to determine need. And since one of the features of the CK token is to maintain an Audit trail, the sender can determine remotely what the acceptor has done with previously received funds, assuming privacy rules have not been violated. This feature also applies to the use of Gift cards and examination of the remaining value of the card.

Use Case 5: Remote Transfer of Authorization to an Agent

Transfer of privileged information can also use these same techniques with the same assurance levels. One application may be a physician using a secure video communication application with a medic in the field. The physician can choose to securely authorize a medical procedure to be done or medication to be administered to the medic (agent). The medic now has been given a specific elevated privilege as an agent of the physician. Again, an audit log is stored on each end user's token to record the transfer of authorization to the agent.

Test results, passwords and bank account numbers and balances are but some of many other examples of this kind of information transfer possible with the CK token and smartphone configuration discussed in this paper as well as ability to display the secure contents of the CK memory.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for secure mobile communications between a first user having a first mobile communications device and a first secure token and a second user having a second mobile communications device and a second secure token, wherein said first and second mobile devices each has a near-field communications reader, a user interface and a display, said first secure token has a first secure processor, a first secure non-volatile memory having decryption key information stored therein, a first display, a first power near-field communications antenna and a first data near-field communications antenna and said second secure token has a second secure processor, a second secure non-volatile memory having decryption key information stored therein, a second display, a second power near-field communications antenna and a second data near-field communications antenna, comprising the steps of:

performing verification of a first user comprising the steps of:
powering said first secure token with energy received through said first power near-field communications antenna from said near-field communications reader in said first mobile device;
enabling said first secure token as a master device relative to said first mobile communications device;
enabling said first mobile communications device as a servant device relative to said first mobile communications device;
executing a cryptographic mutual challenge response algorithm between said first secure token and said first mobile communications device;
unlocking first authentication data of said first user in said first secure token in response to successful execution of said cryptographic mutual challenge response algorithm;
prompting a first user to enter authentication data through said interface in said first mobile device;
transmitting authentication data entered by said first user through said interface in said first mobile device to said first secure token through said first data near-field communications antenna;
comparing in said first secure processor authentication data received from said first mobile device with said unlocked authentication data;
generating on said first display an indication of a result of said comparing;
unlocking a first private decryption key associated in said first secure memory with said first user;
transmitting said first private unlock key from said first secure token to said first mobile device through said data near-field communications antenna;
decrypting an encrypted application stored on said first mobile communications device using said first private unlock key received from said first secure token;
transmitting a verification request from said first mobile communications device to said second mobile communications device using said decrypted application on said first mobile communications device;

performing verification of a second user comprising the steps of:
powering said second secure token with energy received through said second power near-field communications antenna from said near-field communications reader in said second mobile device;
enabling said second secure token as a master device relative to said second mobile communications device;
enabling said second mobile communications device as a servant device relative to said second mobile communications device;
executing a cryptographic mutual challenge response algorithm between said second secure token and said second mobile communications device;
unlocking a user's authentication data in said second secure token in response to successful execution of said cryptographic mutual challenge response algorithm;
prompting a second user to enter authentication data through said interface in said second mobile device;
transmitting authentication data entered by said second user through said interface in said second mobile device to said second secure token through said second data near-field communications antenna;
comparing in said second secure processor authentication data received from said second mobile device with said unlocked authentication data;
generating on said second display an indication of a result of said comparing;
unlocking a second private decryption key associated in said second secure memory with said second user;
transmitting said second private unlock key from said second secure token to said second mobile device through said data near-field communications antenna; and
decrypting an encrypted application stored on said second mobile communications device using said second private unlock key received from said second secure token;
generating in said second secure token an encrypted verification reply;
transmitting said encrypted verification reply from said second mobile communications device to said first mobile communications device using said decrypted application on said first mobile communications device;
decrypting said encrypted verification reply in said first secure token;
verifying in said first security processor an identify of said second user from said decrypted verification reply;
displaying on said first display a result of said verification of an identity of said second user.

2. The method for secure mobile communications according to claim 1 wherein said authentication data comprises one of a password template and a biometric template.

3. The method for secure mobile communications according to claim 1 further comprising generating and displaying on said first display on said first secure token a status message in response to successful execution of said cryptographic mutual challenge response algorithm between said first secure token and said first mobile communications device.

4. The method for secure mobile communications according to claim 1, further comprising the step of establishing a secure phone call in response to a verification in said first security processor of an identify of said second user from said decrypted verification reply.

5. The method for secure mobile communications according to claim 4, further comprising the step of generating an audit file in said first secure token in response to said establishing of a secure phone call and storing said generated audit file in said first secure memory.

6. The method for secure mobile communications according to claim 5, further comprising the step of generating an audit file in said second secure token in response to said establishing of a secure phone call and storing said generated audit file in said second secure memory.

7. The method for secure mobile communications according to claim 1, further comprising the step of performing a financial transaction between said first secure token and said second secure token in response to a verification in said first security processor of an identify of said second user from said decrypted verification reply.

* * * * *